United States Patent

Autenrieth et al.

[11] Patent Number: 5,935,277
[45] Date of Patent: Aug. 10, 1999

[54] REFORMING REACTOR, PARTICULARLY FOR THE WATER VAPOR REFORMING OF METHANOL

[75] Inventors: Rainer Autenrieth, Erbach; Dietmar Heil, Schwendi; Wolfgang Weger, Benningen; Uwe Benz, Uhldingen, all of Germany

[73] Assignee: Daimler-Benz AG, Germany

[21] Appl. No.: 08/876,390

[22] Filed: Jun. 16, 1997

[30] Foreign Application Priority Data

Jun. 15, 1996 [DE] Germany ............... 196 23 918

[51] Int. Cl.⁶ ....................... B01J 8/00
[52] U.S. Cl. ............ 48/127.9; 422/219; 422/221; 422/311; 422/142; 422/101; 422/102; 422/133; 422/131; 48/67; 48/62 A; 55/270; 96/137; 96/149
[58] Field of Search .................. 422/219, 221, 422/311, 142, 101, 102, 133, 131; 48/67, 62 A; 55/185, 270; 96/137, 149

[56] References Cited

U.S. PATENT DOCUMENTS 5,156,821 10/1992 Murayama ............... 422/191
5,445,781 8/1995 Addeo et al. ............ 264/328.6
5,585,075 12/1996 Takano et al. ........... 422/219
5,687,780 11/1997 Minami ..................... 141/286

FOREIGN PATENT DOCUMENTS 4420752 9/1995 Germany.
4423587 1/1996 Germany.
63-2102 1/1988 Japan.
63-21202 1/1988 Japan ............... C01B 1/38

*Primary Examiner*—Glenn Caldarola
*Assistant Examiner*—Tung Doan
*Attorney, Agent, or Firm*—Evenson, McKeown, Edwards & Lenahan, P.L.L.C.

[57] ABSTRACT

In a reforming reactor suitable particularly for the water vapor reforming of methanol in mobile applications such as vehicles, a reaction space is filled with a catalyst pellet fill and has a movable reaction space wall which exerts a position-fixing pressure onto the catalyst pellet fill. According to the invention, a filling device is provided through which catalyst material can be filled from the outside into the reaction space through a passage opening formed in one of the reaction space walls.

10 Claims, 2 Drawing Sheets

REFORMING REACTOR, PARTICULARLY FOR THE WATER VAPOR REFORMING OF METHANOL

This application claims the priority of German patent application 196 23 918.4, the disclosure of which is expressly incorporated by reference herein.

BACKGROUND AND SUMMARY OF THE INVENTION

The invention relates to a reforming reactor having a reaction space which is filled with a catalyst material in the form of pellets (sometimes referred to herein as a "catalyst pellet fill") and has a movable wall which exerts pressure on the catalyst pellets to hold them in position.

Numerous types of reforming reactors with a catalyst pellet fill charged in the reaction chamber are known, and are used, for example, for producing hydrogen as fuel for a fuel cell arrangement. Reforming reactors of this type are disclosed, for example, in German patent documents DE 44 23 587 A1 and DE 44 20 752 A1.

Particularly, in the case of mobile applications, for example, when used in fuel-cell-operated motor vehicles, jolts occur which, in the case of a catalyst pellet fill which is freely movable within the reaction chamber, may result in increased abrasion of the pellets. Such abrasion is undesirable because it may cause clogging or otherwise impair the components which are connected downstream. In addition, in the case of a loose pellet fill, vehicle position changes result in corresponding position changes of the catalyst material within the reforming reactor. In extreme situations, for example, in the case of steep slopes, this may have a disadvantageous effect on the uniform gas distribution and thus on the efficiency of the reactor.

In the reforming reactor referred to above, these difficulties are resolved by providing a movable reaction space wall which, on the one hand, permits the gas to pass through and, on the other hand, exerts position-fixing pressure onto the catalyst pellet fill. A reactor of this construction is disclosed in the Japanese Published Patent Application JP 63-21202 (A). There, the catalyst pellet fill charged into a tube-shaped reaction chamber is situated on a porous carrier plate and is covered on the top side by a reaction chamber cover. The latter is also porous, is arranged in a movable manner, and is pressed onto the catalyst pellet fill by means of coil springs which are supported on a reactor housing wall. The covering cap is arranged in a movable manner in order to permit an exchange of the catalyst material when the cap is removed.

Such an exchange or a refilling of catalyst material may be necessary from time to time, especially in the case of reforming reactors for producing hydrogen in mobile applications. Particularly in applications in vehicles, a compact arrangement of the gas production components is desirable for installation of the reforming reactor (for example, for producing hydrogen for a fuel cell system). Because of the limited narrow space conditions in the vehicle, it is undesirable to have to remove the reaction chamber covering of the reactor as a whole in order refill catalyst material. There is also the danger that, in case of complete removal of the covering, the catalyst material will come in contact with ambient oxygen over a large surface, which frequently damages the active catalyst material.

One object of the invention, therefore, is to provide a reforming reactor of the initially mentioned type which is particularly suitable for mobile applications (for example, for producing hydrogen for a fuel cell system of a motor vehicle).

Another object of the invention is to provide such a reforming reactor which permits a comparatively simple and trouble free refilling of catalyst material into the reaction chamber.

These and other objects and advantages are achieved by the reforming reactor according to the invention, in which the reaction space can be filled from the outside through a passage opening formed in the reaction space walls. In this reforming reactor, on the one hand, the catalyst pellet fill is subjected to a position-fixing pressure which largely prevents abrasion of the catalyst pellets of a loose pellet fill due to the swirling, particularly as the result of vehicle jolts, when used in motor vehicles. The development of fine abrasion dust which may cause clogging within the catalyst pellet fill, or of a filter connected downstream, is thus largely prevented. This, in turn prevents an increased pressure drop (and therefore a deterioration of the reforming characteristics) over the reforming reactor as the result of such clogging.

On the other hand, because the reforming reactor has a charging device by which catalyst material can be charged from the outside through a passage opening in one of the reaction space walls, it is unnecessary to remove a whole reaction space wall in order to refill or exchange catalyst material. Thus, there is no danger that the active catalyst material situated in the reaction space will come in contact with the outside atmosphere (for example, with damaging ambient oxygen) on the whole surface situated opposite the concerned reaction space wall. On the contrary, such contact is limited to the surface of the passage opening of the charging device, which can clearly be kept smaller than that of a whole reaction space wall.

According to the invention, the charging device contains a charging tube, one end of which leads into the passage opening of the pertaining reaction space wall, and the other end of which can receive catalyst material from the outside. The charging tube can be securely closed off against the passing-through of catalyst material by means of a closing plunger, which may, depending on the application, be gas-permeable.

In another embodiment of the invention, the charging device has a movable reaction space wall which can be moved back against the direction of the applied pressure during a refilling operation. This makes it possible to relieve the catalyst pellet fill from the position-fixing applied pressure, and to create space for replenishing catalyst material. In this manner, catalyst can be pushed into the reaction space without a high compressive load, which minimizes resulting abrasion of the catalyst pellets.

In still another embodiment of the invention, the passage opening for charging catalyst material into reaction space is provided in the movable reaction space wall, which is also perforated so that it is gas-permeable. The catalyst material is replenished by way of a charging tube, one end of which is fixed to the movable reaction space wall, so that it can simultaneously be used as an operating element for moving this reaction space wall back against the applied pressure. The tube extends through a gas inlet or gas outlet space which adjoins the movable reaction space wall on the side opposite the reaction space, and leads into a filling neck which can be covered toward the outside by a detachable closing device. Depending on the application, in this case the charging tube can be disposed in a gas-tight manner in the filling neck. Alternatively, in an implementation which is not gas tight, gas can flow from the gas inlet space into the filling neck, and from there through the charging tube and the (gas-permeable) closing plunger, into the reaction space. The latter arrangement has the advantage that the catalyst material situated in the area of the charging tube will also be able to actively participate in the reforming reaction.

Yet another embodiment of the reforming reactor according to the invention has an outlet device arranged in the lower portion of the reaction chamber, by means of which catalyst material can be discharged from the reaction space. Thus, it is also unnecessary to completely remove a reaction space wall or the reaction space covering for partial or complete removal of catalyst material from the reaction space.

Other objects, advantages and novel features of the present invention will become apparent from the following detailed description of the invention when considered in conjunction with the accompanying drawings.

DETAILED DESCRIPTION OF THE DRAWINGS

Figure 1:
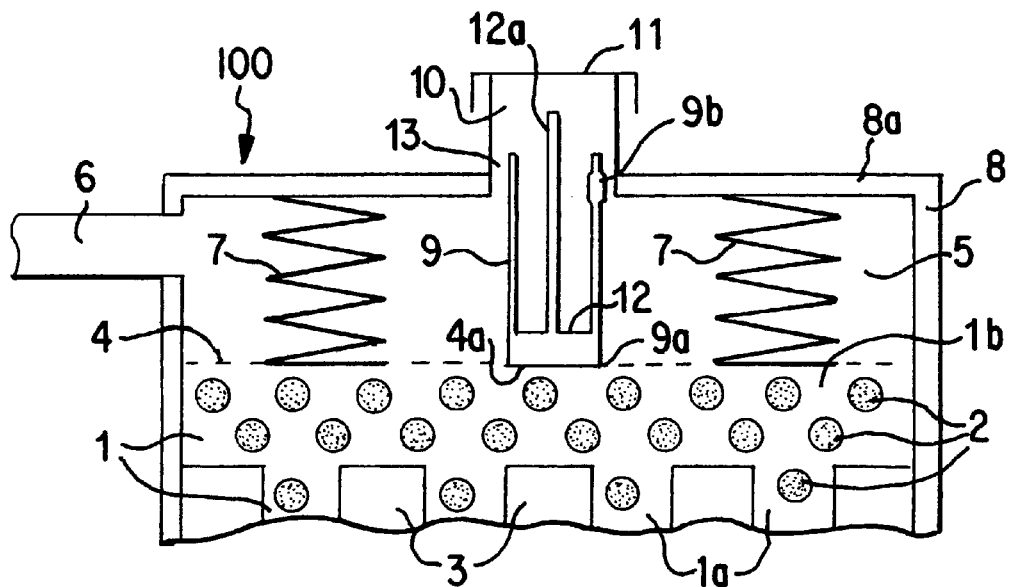
FIG. 1 is a schematic sectional view of an upper portion of a reforming reactor.

The reforming reactor whose upper portion is partially shown in FIG. 1 can be used, for example, for water vapor reforming of methanol to produce hydrogen as a fuel for a fuel cell arrangement provided in a motor vehicle. The reforming reaction takes place in a reaction space 1 of a reaction chamber 100. The reaction space 1 is filled with a catalyst pellet fill 2, which is shown schematically. The selection of the catalyst material depends on the reforming reaction to be carried out. A $Cu/ZnO/Al_2O_3$ material, for example, is suitable for the water vapor reforming of methanol. In a center section, the reaction space 1 contains tube-shaped reaction ducts 1a which adjoin tempering fluid ducts 3, through which a tempering fluid can flow in order to maintain the reaction space 1 at a temperature required to implement the reforming reaction. The upper ends of tempering fluid ducts 3 abut an upper, inlet-side reaction space area 1b whose volume is filled completely with the catalyst pellet fill 2, and the tube-shaped reaction space ducts 1a leading into the reaction space area 1b.

The top side of the reaction space 1 is separated from an outer gas space 5 (into which the connection opening 6 leads) by an axially movable reaction space wall in the form of a perforated movable pressure plate 4 made, for example, of a sheet metal material. The connection opening 6 leads from the outer gas chamber 5 to the outside, through a reactor housing 8 which housing surrounds the outer gas chamber 5 and the reaction space 1. In the present case, the outer gas chamber 5 forms a gas inlet space, which in this case acts as an inlet opening for receiving the gas mixture to be reacted, via the connection opening 6. Thereafter, the gas is introduced by way of the perforated movable pressure plate 4 into the reaction space 1. Alternatively, in the case of a reverse gas flow, the outer gas chamber 5 acts as a gas outlet space, which collects the reformate gas formed in the reaction space 1. From there, the gas is withdrawn by way of the connection opening 6 then acting as an outlet opening.

Arranged in the outer gas chamber 5 are coil springs, which act as pressure springs. One end of these springs is supported against the upper housing wall 8a, while the other bears against the perforated movable pressure plate 4 and exerts a pressure force onto the perforated movable pressure plate 4 in the direction of the reaction space 1. The perforated movable pressure plate 4 therefore exerts a corresponding pressure on the catalyst pellet fill 2 in the reaction space 1, so that the individual pellets are not present as a loose fill in the reaction space 1, but are fixed in their mutual position. As a result, even jolts, which act upon the reforming reactor in the driving of a motor vehicle, do not cause a mutual rubbing movement of the individual pellets. In addition, the pressure applied to the catalyst pellet fill 2 prevents any swirling-up of individual pellets by the gas flow which is guided through the reaction space 1. Since the pressure applied to the catalyst pellet fill 2 holds the catalyst pellets largely immobile in their respective positions, it prevents a more intensive abrasion of the pellets, and the formation of a fine abrasion dust which might otherwise clog not only the catalyst pellet fill 2 itself, but also units which follow, such as a filter (not shown). Such clogging would otherwise lead to an increased pressure drop over the reforming reactor which, in turn, would degrade the reforming characteristics.

It is understood that the applied pressure can be suitably adjusted according to the application, by the appropriate selection of the type and number of coil springs 7. The coil springs 7 are preferably positioned to be uniformly distributed over the surface of the perforated movable pressure plate 4 in order to apply a uniform pressure on the catalyst pellet fill 2. Since the springs 7 are arranged in the outer gas chamber 5 and therefore come into contact with the gases situated there, which may be reactive and/or hot, they are preferably stainless and high-temperature resistant. Naturally, instead of the springs 7, other conventional devices can also be used for generating the required pressure force onto the perforated movable sheet metal plate 4 in the direction of the reaction space 1.

The reforming reactor also contains a charging device by which catalyst pellet material can be charged into the reaction space 1 when either the whole catalyst pellet fill 2 is to be exchanged, or an operation-caused reduction of catalyst material in the reaction space 1 is to be replenished. The charging arrangement is designed so that it permits charging of catalyst pellet material into the reaction space 1 in a simple manner even in narrow or constricted space conditions. In particular, it is not necessary for this purpose to remove a whole housing wall of the reforming reactor and/or to remove the pressure plate 4 from the reactor housing 8. For this purpose, the charging arrangement contains a passage opening 4a formed in the perforated movable perforated pressure plate 4 and a charging tube 9. One end 9a of the charging tube 9 leads into the passage opening 4a, and is fixed on the perforated movable edge on the pressure plate 4. The charging tube 9 extends from the perforated movable pressure plate 4 axially upward through the gas inlet space into a filing neck 10 which is provided in the center on the upper reactor housing wall 8a. The filling neck 10 can be closed off to the outside by means of a closing cover or cap 11 which can be screwed on.

During operation of the reactor, a closing plunger 12 is screwed into the inside of the charging tube 9 and prevents that catalyst pellets in the reaction space 1 from entering the charging tube 9. Preferably, the plunger 12 has a gas-permeable construction, for the purpose of which it has a suitable perforated or porous structure. In addition, the outside diameter of the charging tube 9 is selected to be a predetermined amount smaller than the inside diameter of the filling neck 10. Thus, the reaction gas mixture which enters by way of the inlet opening 6 can flow from the outer gas chamber 5 not only directly through the perforation holes of the pressure plate 4 but also through a gap 13 formed between the charging tube 9 and the filling neck, into the interior of the charging tube 9, and from there, by way of the gas-permeable plunger 12, into the reaction space 1. As a result, the reaction gas mixture can also flow in the reaction space 1 against the catalyst material which is directly adjacent to the plunger 12, so that it can actively participate in the reforming reaction. Alternatively, this gas inflow by way of the interior of the charging tube 9 can be eliminated, by providing the plunger 12 with a gas-tight construction. Likewise, in this case, the charging tube 9 can extend in the filling neck 10 in a sealed-off manner.

To charge the catalyst pellet material into the reaction space 1, the closing cover 11 is first unscrewed, and the charging tube 9 (together with the perforated movable pressure plate 4) is pulled upward against the pressure force exercised by the springs 7 by grasping the elongated handle 12a, and is fixed in an upper end position by means of a holding clamp (not shown) which engages with a notch 9b provided on the charging tube 9 adjacent the upper end of the filling neck 10. The closing plunger 12 is then unscrewed, whereupon catalyst pellet material can be charged by way of the interior of the charging tube 9 into the reaction space 1. Due to the previous pulling-up of the perforated movable pressure plate 4, the catalyst pellet fill 2 in the reaction space 1 is under no applied pressure during the charging operation. Thus, the replenishing catalyst material can simply be filled into the reaction space 1 without having to be pressed into it, which could otherwise lead to undesirable increased abrasion phenomena. After the desired quantity of catalyst material has been supplied, the closing plunger 12 is screwed back into the charging tube 9. While the holding clamp is released, the charging tube 9 and the perforated movable pressure plate 4, are again moved by pressure of the springs 7 in the direction of the reaction space 1, until the perforated movable pressure plate 4 and the plunger 12 come to rest again against the catalyst pellet fill 2, exerting position-fixing pressure once again. Then the closing cover 11 is screwed back onto the filling neck 10.

The charging device therefore permits a relatively simple replenishment of catalyst pellet material while the space requirement is relatively low. This arrangement also avoids a complete removal of the perforated movable pressure plate 4 (or of another reaction space wall), which would allow the catalyst pellet fill 2 on one side to come in contact over a whole surface with the outside atmosphere, for example, with air oxygen, is avoided. Such a contact frequently causes an undesirable degradation of the catalytic activity of the catalyst material. By contrast, in the present charging arrangement, at most a very small portion of the catalyst pellet fill 2 which adjoins the charging tube 9, comes in contact with the outside atmosphere. This contact can, in addition, be limited to an extremely short time period since it will end no later than the start of the filling of catalyst material into the charging tube 9. The provided charging arrangement, therefore ensures a long active life of the catalyst pellet fill 2, even in the case of more frequent refilling operations.

Figure 2:
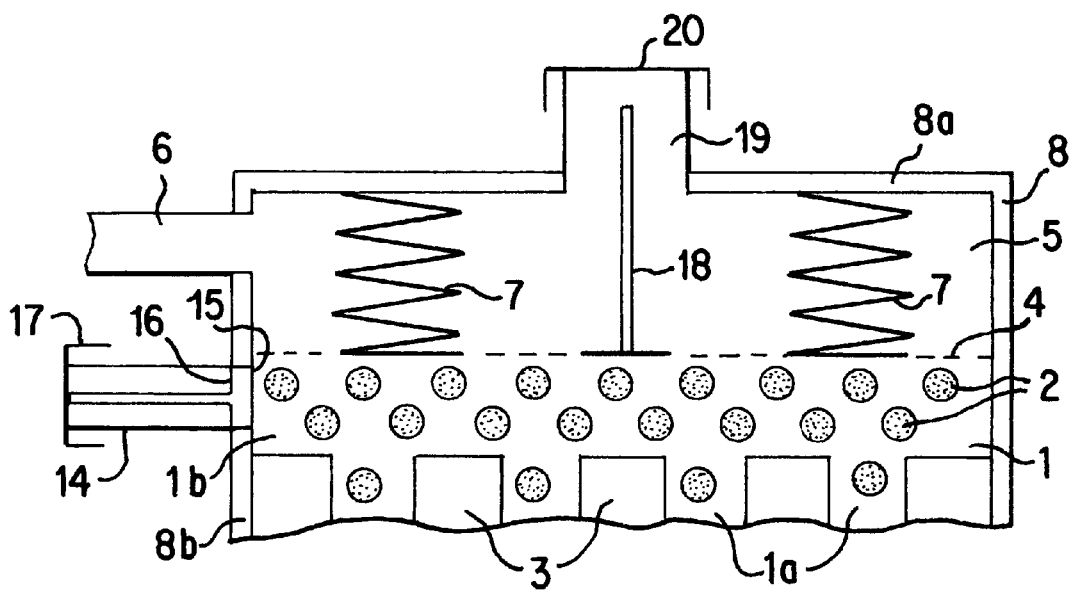
FIG. 2 is a schematic sectional view of the upper portion of another reforming reactor.

FIG. 2 shows a reforming reactor which corresponds to the reactor of FIG. 1, for a differently designed charging arrangement. For the purpose of clarity, the same reference numbers are used for functionally identical elements in both FIGS. 1 and 2, and to this extent reference can be made to the description of FIG. 1. The charging device used in the reactor of FIG. 2 permits a largely pressureless lateral charging or replenishing catalyst pellet material into the reaction space 1. For this purpose, the charging device, on the one hand, contains a laterally arranged charging tube 14 which is inserted into a passage opening 15 formed in the corresponding lateral reactor housing wall 8b at the level of the upper area 1b of the reaction space 1. In normal reactor operation, the charging tube 14 is closed off by a preferably gas-tight screwed-in plunger 16 at the level of the housing wall passage opening 15. The exterior end of the charging tube 14 can be closed off by means of a charging tube closing cover or cap 17 which can be screwed on. In order to lift the perforated movable pressure plate 4 against the effect of the coil springs 7 in this reactor, the charging device also has a tie rod 18 which is fixed at one end on the perforated movable pressure plate 4 and extends from there axially upward through the outer gas chamber 5 into a housing neck 19 which is provided in the center on the upper reactor housing wall 8a and which is covered by a housing neck closing cover or cap 20 which can be screwed on.

To refill catalyst material in this reactor, the housing neck closing cover 20 is first unscrewed in order to grip the tie rod 18 and pull it upward, together with the perforated movable pressure plate 4, against the pressure force of the springs 7. Fixing devices (not shown) interact with the portion of the tie rod 18 which projects out of the reactor housing neck 19, so that the tie rod 18 and the perforated movable pressure plate 4 can be fixed in the lifted position. Then the charging tube closing cover 17 is unscrewed and the closing plunger 16 is screwed out of the charging tube 14. The catalyst pellet material to be filled in can now be charged laterally by way of the charging tube 14. Depending on the situation, this can take place by a corresponding inclination of the reactor housing 8 and/or with the aid of the closing plunger 16 used as a pusher. When the desired quantity of catalyst material has been provided, the closing plunger 16 is screwed back into the charging tube 14 and the charging tube 14 is closed by means of the pertaining closing cover 17. The tie rod fixing is then released, permitting the tie rod 18, together with the perforated movable pressure plate 4, to move downward under pressure of the coil springs 7 until the perforated movable pressure plate 4 once again comes to rest under pressure against the catalyst pellet fill 2 in the reaction space, and exerts the desired pressure onto it.

As demonstrated, FIG. 2 also permits relatively simple replenishment of catalyst material, even in narrow space conditions. Also, during a charging operation, no more than a small-surface of the active catalyst material in the reaction space 1 comes into contact with the outside environment (for example, air oxygen), and for a very short period of time.

Figure 3:
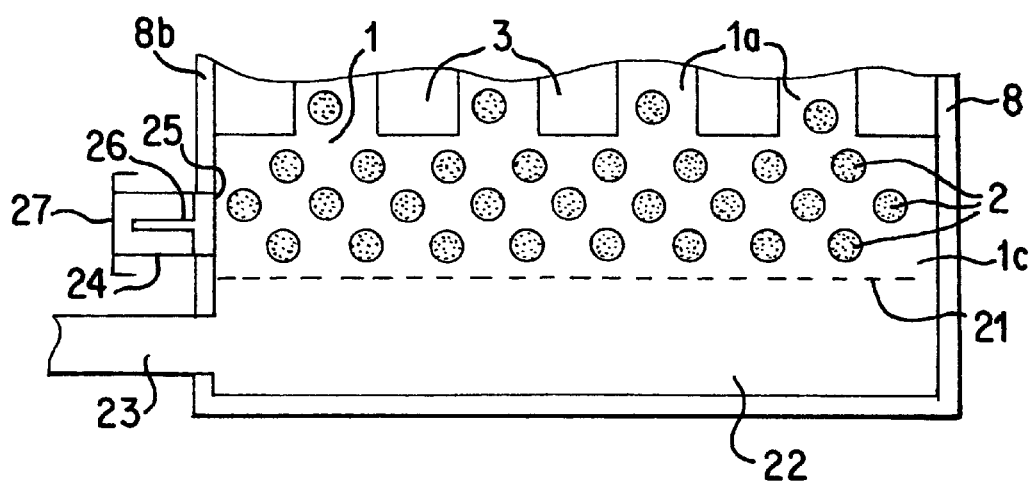
FIG. 3 is a schematic sectional view of the lower portion of a reforming reactor of the type of FIGS. 1 and 2.

FIG. 3 shows schematically the lower area of a reforming reactor constructed according to FIGS. 1 or 2. Functionally identical elements in FIG. 3 are again provided with the same reference numbers, and reference is made in this respect to the description of FIGS. 1 and 2.

In the reactor of FIG. 3, the bottom side of the reaction space 1 is bounded by a perforated carrier plate 21 on which the catalyst pellet fill 2 is disposed. The tempering fluid ducts 3 and the tube-shaped reaction space ducts 1a end on the bottom side at a distance above the carrier plate 21, so that a lower reaction space area 1c is formed which is completely filled with the catalyst pellet fill 2. An outer gas space 22, which in this embodiment, operates as a gas outlet space, adjoins below the carrier plate 21 still within the reactor housing 8 and can alternately operate as a gas inlet space. The reformate gas, which was reacted in the reaction space 1 and has passed through the perforated carrier plate 21 collects in the outer gas chamber 22 and is led out of the reactor housing 8 by way of an outlet opening 23, which alternately may be formed in a lateral reactor housing wall 8b and can also act as an inlet opening.

In order to remove catalyst pellet material from the reaction space 1 in a simple manner, as required (for example, in the case of a complete exchange of the catalyst pellet fill 2), the reactor of FIG. 3 has a removal device. This removal device contains an outlet tube 24 which is inserted laterally into a housing passage opening 25 formed in the reactor housing wall (in which the outlet opening 23 is also situated) at the level of the lower part of the lower reaction space area 1c. The outlet tube 24 can be closed at the level of the housing passage opening 25 by a closing plunger 26, which can be screwed in. At its exterior end, the outlet tube 24 can be covered by an outlet tube closing cover or cap 27 which can be screwed on.

When the outlet tube closing cover 27 is unscrewed and the closing plunger 26 is screwed out of the outlet tube 24, the catalyst pellet material 2 will trickle by way of the outlet tube 24 out of the reaction space 1. As soon as all or a desired portion of the catalyst pellet material 2 situated in the reaction space 1 has emerged by way of the outlet tube 24, the closing plunger 26 is screwed in again, after which the closing cover 27 can be screwed onto the outlet tube 24.

The embodiment of FIG. 3 shows that, by means of the invention, reforming reactors can be implemented which are also specifically suitable for mobile applications with a limited space. The construction according to the invention ensures not only a position-securing fixing of the catalyst pellet fill in the reaction space, and relatively simple and advantageous refilling of catalyst pellet material into the reaction space, but also catalyst pellet material can be discharged out of the reaction space without difficulty and without requiring demounting operations on the reactor housing.

It is understood that reforming reactors according to the invention, as required, may comprise several of the illustrated reaction space arrangements connected in parallel or in series. In this case, for example, reforming reactors of the tube bundle reactor type as well as of the plate reactor type with catalyst pellet fills which are subjected to pressure in the reaction spaces can be implemented by means of the explained charging and removal arrangements.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Reforming reactor comprising:

a reaction space defined by reaction space walls, and filled with a catalyst pellet fill;

one of said reaction space walls comprising a movable reaction space wall, which movable reaction space wall applies a position-fixing pressure onto the catalyst pellet fill;

a passage opening formed in a reaction space wall of the reaction space; and a charging device coupled in communication with said passage opening, for filling catalyst pellet fill into the reaction space through said passage opening.

2. Reforming reactor according to claim 1, wherein the charging device comprises:

a charging tube having one end which leads into the passage opening, and an opposite end through which catalyst pellet fill can be filled into the reaction chamber; and a closing plunger for securely closing the charging tube to the passage of catalyst material in the area of the passage opening.

3. Reforming reactor according to claim 1, wherein the charging device includes a device for causing the movable reaction space wall to move in a direction against the position-fixing pressure applied to the catalyst pellet fill.

4. Reforming reactor according to claim 2, wherein the charging device includes devices for moving the movable reaction space wall against the position-fixing pressure applied to the catalyst pellet fill.

5. Reforming reactor according to claim 2, wherein the passage opening is formed in the movable reaction space wall;

said reforming reactor further comprises an outer gas chamber which is adjacent said reaction space and is coupled in gas flow communication with said reaction space; and the charging tube has a first end which is fixed on the movable reaction space wall, and a second end which extends through the outer gas space into a filling neck which can be closed off by a detachable closing cover.

6. Reforming reactor according to claim 3, wherein the passage opening is formed in the movable reaction space wall;

said reforming reactor further comprises an outer gas chamber which is adjacent said reaction space and is coupled in gas flow communication with said reaction space; and the charging tube has a first end which is fixed on the movable reaction space wall, and a second end which extends through an the outer space into a filling neck which can be closed off by a detachable closing cover.

7. Reforming reactor according to claim 1, further comprising an outlet device arranged in a lower area of the reaction space for removal of catalyst material from the reaction space.

8. Reforming reactor according to claim 2, further comprising an outlet device arranged in a lower area of the reaction space for removal of catalyst material from the reaction space.

9. Reforming reactor according to claim 3, further comprising an outlet device arranged in a lower area of the reaction space for removal of catalyst material from the reaction space.

10. Reforming reactor according to claim 5, further comprising an outlet device arranged in a lower area of the reaction space for removal of catalyst material from the reaction space.

\* \* \* \* \*